(12) United States Patent
Tsunetomo et al.

(10) Patent No.: US 11,555,596 B2
(45) Date of Patent: Jan. 17, 2023

(54) RADIATION ANGLE CHANGING ELEMENT AND LIGHT EMITTING DEVICE

(71) Applicant: Nippon Sheet Glass Company, Limited, Tokyo (JP)

(72) Inventors: Keiji Tsunetomo, Sagamihara (JP); Satoru Kusaka, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 17/505,186

(22) Filed: Oct. 19, 2021

(65) Prior Publication Data

US 2022/0034477 A1 Feb. 3, 2022

Related U.S. Application Data

(63) Continuation of application No. PCT/JP2020/015470, filed on Apr. 6, 2020.

(30) Foreign Application Priority Data

Apr. 22, 2019 (JP) .............................. JP2019-081241

(51) Int. Cl.
*F21V 17/06* (2006.01)
*F21V 5/00* (2018.01)

(52) U.S. Cl.
CPC .............. *F21V 5/004* (2013.01); *F21V 17/06* (2013.01)

(58) Field of Classification Search
CPC ........... F21V 5/002; F21V 5/004; F21V 17/06
See application file for complete search history.

(56) References Cited

U.S. PATENT DOCUMENTS 10,088,140 B2 * 10/2018 Balimann ................ F21V 3/00
2014/0376097 A1 * 12/2014 Yamashita ........ H01L 27/14627
359/619

FOREIGN PATENT DOCUMENTS

| JP | 08-254604 A | | 10/1996 |
| JP | 08-254641 A | | 10/1996 |
| JP | 2005228775 | * | 8/2005 |
| JP | 2009-042772 A | | 2/2009 |
| JP | 2017-009669 A | | 1/2017 |
| JP | 2018-025713 A | | 2/2018 |
| WO | 2007/094259 A1 | | 8/2007 |
| WO | 2016/156863 A2 | | 10/2016 |

OTHER PUBLICATIONS

International Search Report dated Jun. 23, 2020 from the International Searching Authority in International Application No. PCT/JP2020/015470.
International Preliminary Report on Patentability with the translation of Written Opinion dated Sep. 28, 2021 from the International Bureau in International Application No. PCT/JP2020/015470.

* cited by examiner

*Primary Examiner* — Julie A Bannan
(74) *Attorney, Agent, or Firm* — Sughrue Mion, PLLC (57) ABSTRACT

A radiation angle changing element bonded to a housing includes: a glass substrate; and a resin layer provided on the glass substrate and having an optically functioning part. In a bonding portion bonded to the housing, the resin layer is not formed on the glass substrate.

11 Claims, 12 Drawing Sheets

RADIATION ANGLE CHANGING ELEMENT AND LIGHT EMITTING DEVICE

BACKGROUND OF THE INVENTION

1. Field of the Invention

The present invention relates to radiation angle changing elements that change the radiation angle of in an incident beam.

2. Description of the Related Art

Radiation angle changing elements for scattering incident light in various directions or changing the angle thereof are used in display units or screens of displays and are also widely used in a variety of devices such as illumination devices for the purpose of obtaining uniform illumination intensity. Generally, the radiation angle of light emitted by a light source is often expanded.

Recently, advanced performance such as expansion of the light emission angle, improvement of the light intensity distribution with respect to the radiation angle, and uniformization of the in-plane intensity distribution of the projected diffused light is required. For example, there are needs for diffusing light radiated from an array of vertical cavity surface emitting laser (VCSEL) at a predetermined divergence angle to a larger angular range and imparting the diffusion angle with anisotropy.

Several types of elements for diffusing light or changing the angle are available. For example, elements produced by distributing minute spaces or distributing microparticles inside a flat plate (e.g., semitransparent resin plate), randomly providing a substrate surface with microscale irregularities (e.g., glass roughened by etching the surface), working a substrate surface to form irregularities as designed (e.g., diffraction element), or arranging a large number of lenses on a substrate surface (e.g., microlens array) are known.

Of these, radiation angle changing elements in which a microlens array is used have a high transmittance and allow the diffusion angle to be controlled easily and so are employed when advanced diffusion performance is called for (see, for example, patent documents 1, 2).

[Patent literature 1] JP 2009-42772
[Patent literature 2] JP2017-9669

Figure 1:
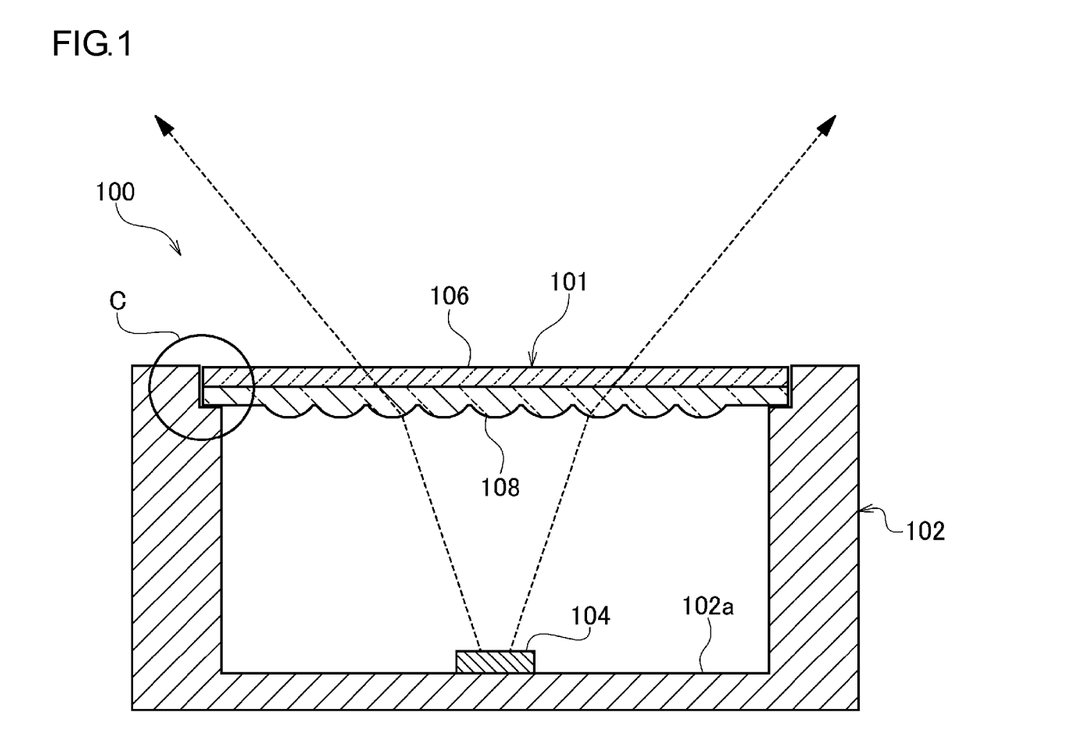
FIG. 1 is a schematic cross-sectional view showing an example of the light emitting device in which a related-art radiation angle changing element is used.

FIG. 1 is a schematic cross-sectional view showing an example of a light emitting device 100 in which a related-art radiation angle changing element 101 is used. The light emitting device 100 includes a housing 102, a light emitting element 104, and a radiation angle changing element 101.

The housing 102 is made of, for example, ceramic and has a shape of a box having an open top. The light emitting element 104 such as a VCSEL is fixed on a bottom surface 102a of the housing 102. The radiation angle changing element 101 is produced by forming a resin microlens array 108 on a glass substrate 106. The radiation angle changing element 101 is bonded to the housing 102 so as to place a lid. This seals a space in which the light emitting element 104 is arranged. Generally, the radiation angle changing element 101 is arranged such that the surface formed with the microlens array 108 faces the light emitting element 104.

Figure 2:
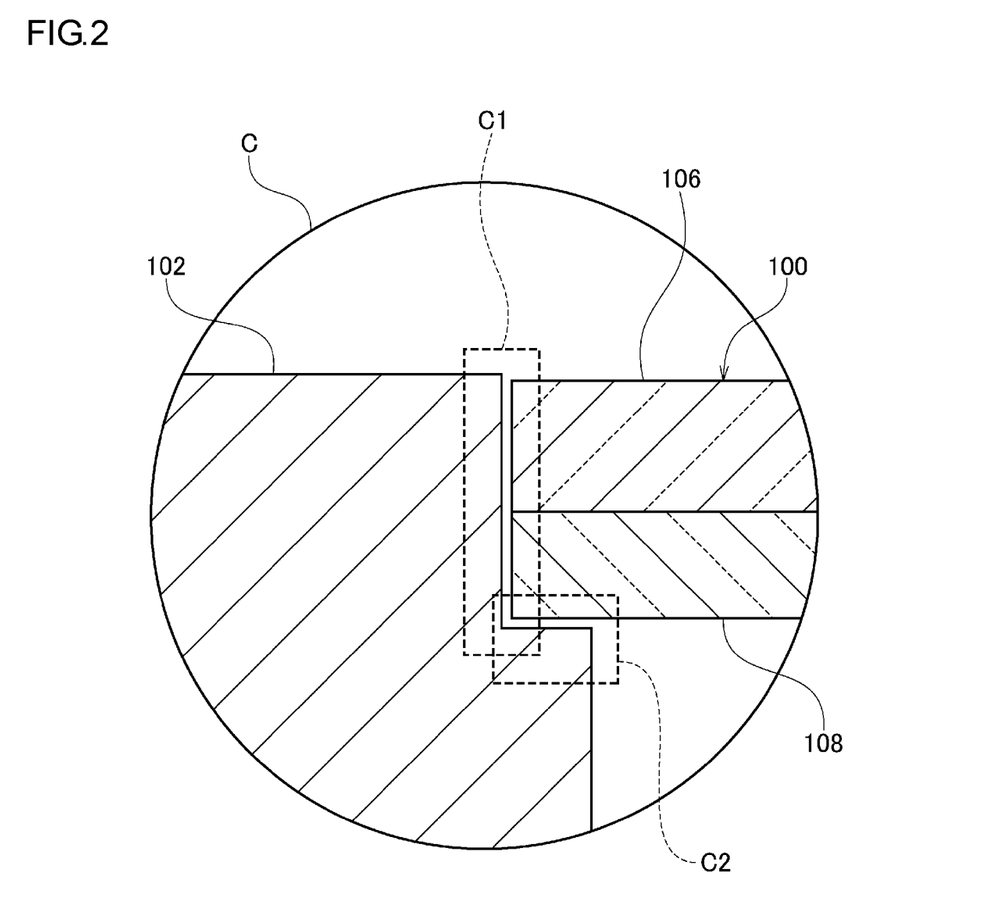
FIG. 2 is an enlarged view of a portion in which the radiation angle changing element shown in FIG. 1 and the housing are bonded.

FIG. 2 is an enlarged view of a portion C in which the radiation angle changing element 101 and the housing 102 are bonded. Methods for bonding the radiation angle changing element 101 to the housing 102 include using an adhesive such as a thermosetting adhesive and a UV setting adhesive, solder bonding, a bonding method for melting low-melting-point glass, diffusion bonding, etc. In any case, the radiation angle changing element 101 and the housing 102 are bonded by using a portion C1 where the side surfaces of the glass substrate 106 and the microlens array 108 face the housing 102 or a portion C2 where the microlens array 108 and the housing 102 face each other.

In the bonding as described above, the bonding strength may be lowered at a portion where the resin microlens array 108 and the ceramic housing 102 are bonded due to a problem with adhesion between the respective materials. Further, the types of bonding described above tend to be sensitive to thermal shock because ceramic and resin have different coefficients of thermal expansion. Further, heat resistance of the resin microlens array is not so high and so there is a problem in the case described above in that a bonding method that requires a high temperature of several hundred degrees (e.g., solder bonding or low-melting-point glass bonding) cannot be used.

SUMMARY OF THE INVENTION

The present invention addresses the above issue and a purpose thereof is to provide a radiation angle changing element that can be bonded firmly to a housing.

A radiation angle changing element according to an embodiment of the present invention is a radiation angle changing element bonded to a housing, including: a glass substrate; and a resin layer provided on the glass substrate and having an optically functioning part. In a bonding portion bonded to the housing, the resin layer is not formed on the glass substrate.

The bonding portion may be provided outside the resin layer.

In the bonding portion, a metal film may be provided on the glass substrate.

In the bonding portion, the metal film may be provided outside the resin layer, and a portion exposing the glass substrate may be provided further outside the metal film.

The optically functioning part may be a microlens array in which a plurality of microlenses are arranged in a two-dimensional array.

Another embodiment of the present invention relates to a light emitting device. The device includes a light emitting element provided in a housing and a radiation angle changing element that is bonded to the housing and changes a radiation angle of light from the light emitting element. The radiation angle changing element includes: a glass substrate; and a resin layer provided on the glass substrate and having an optically functioning part. In a bonding portion bonded to the housing, the resin layer is not formed on the glass substrate.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A description will be given of exemplary embodiments. Identical or like constituting elements, members, processes shown in the drawings are represented by identical symbols and a duplicate description will be omitted as appropriate. The preferred embodiments do not intend to limit the scope of the invention but exemplify the invention. Not all of the features and the combinations thereof described in the embodiments are necessarily essential to the invention.

Figure 3A:
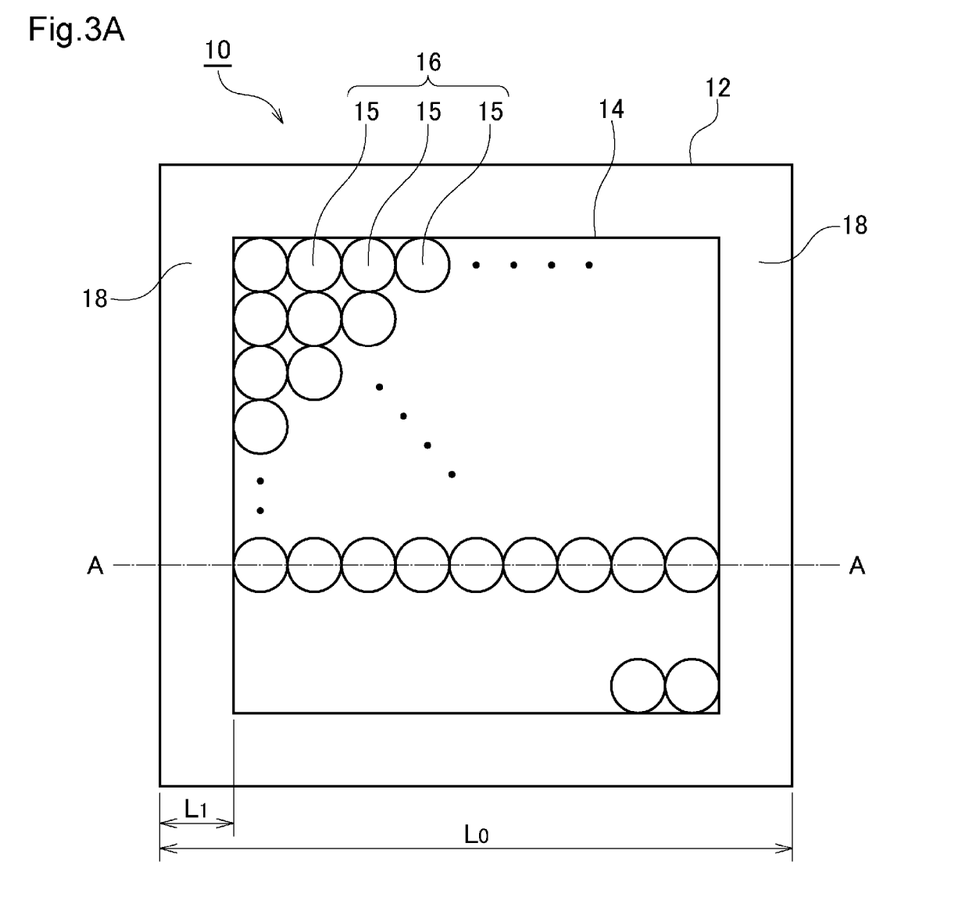
FIGS. 3A and 3B show a radiation angle changing element according to the first embodiment of the present invention.
Figure 3B:
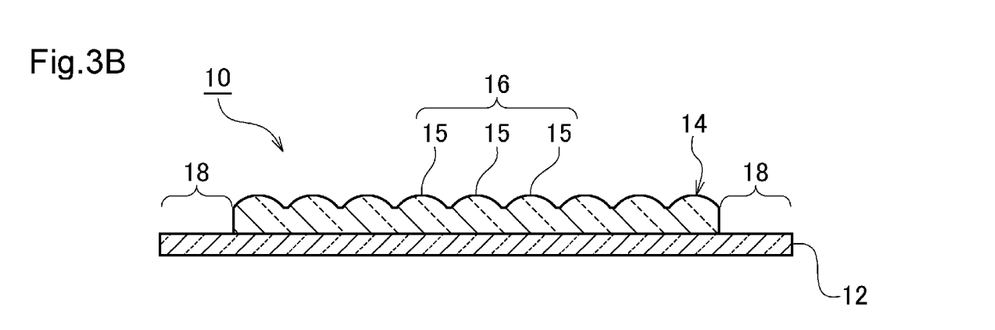

FIGS. 3A and 3B show a radiation angle changing element 10 according to the first embodiment of the present invention. FIG. 3A is a plan view of the radiation angle changing element 10. FIG. 3B is an A-A cross-sectional view of the radiation angle changing element shown in FIG. 3A.

The radiation angle changing element 10 includes a glass substrate 12. The glass substrate 12 may be selected from, for example, soda lime glass, borosilicate glass, etc., and the thickness of the substrate may be 300 µm. The glass substrate 12 may be sized at 2.5 mm×3.0 mm on a plane.

The radiation angle changing element 10 further includes a resin layer 14 having an optically function. The resin layer 14 is provided on at least one of the principal surfaces of the glass substrate 12. In the first embodiment, the resin layer 14 has, as a structure applying an optically function, a microlens array 16 in which a plurality of microlenses 15 are arranged in a two-dimensional array. The material of the resin is not particularly limited as long as it is a resin having a sufficiently high transmittance at the wavelength to be used. For example, epoxy resin, acrylic resin, silicone resin, cycloolefin resin, or a composite thereof can be used. In the first embodiment, the microlens 15 is a convex lens. The type of the microlens 15 is not limited to any particular one. The microlens 15 may be a concave lens or may be comprised of a mixture of a convex lens and a concave lens. The plurality of microlenses 15 may be, for example, arranged in a square array or in a dense array. The outer shape of the microlens 15 may be circular in a planar view or rectangular in a planar view. The height of each microlens 15 from the boundary surface between the resin layer 14 and the glass substrate 12 to the apex of the microlens 15 may be, for example, 50 µm, the radius of curvature may be, for example, 30 µm, and the sag may be, for example, 25 µm.

In the radiation angle changing element 10 according to the first embodiment, the resin layer 14 is provided in the center of one of the principal surfaces of the glass substrate 12, and a portion 18 where the resin layer is not provided on the principal surface of the glass substrate outside the resin layer 14. In other words, the resin layer 14 is not formed over the entirety of the one principal surface of the glass substrate 12 of the radiation angle changing element 10. The portion 18 exposing the surface of the glass substrate 12 is located around the resin layer 14. The portion 18 exposing the surface of the glass substrate 12 will be the bonding portion 18 where the radiation angle changing element 10 and the housing are bonded when the radiation angle changing element 10 is mounted on the housing.

Denoting the width of the glass substrate 12 by $L_0$ and the width of the connecting portion 18 by $L_1$, $L_0$ and $L_1$ are related such that $0.01L_0 \leq L_1 \leq 0.3L_0$, and, desirably, $0.05L_0 \leq L_1 \leq 0.2L_0$, and, more desirably, $0.01L_0 \leq L_1 \leq 0.15L_0$. If $L_1$ is smaller than $0.01L_0$, a contact area to obtain sufficient bonding strength and airtightness cannot be obtained. If $L_1$ is larger than $0.3L_0$, the area of the connecting portion will be too large, which will be an obstacle to reduction of the element size.

Figure 4:
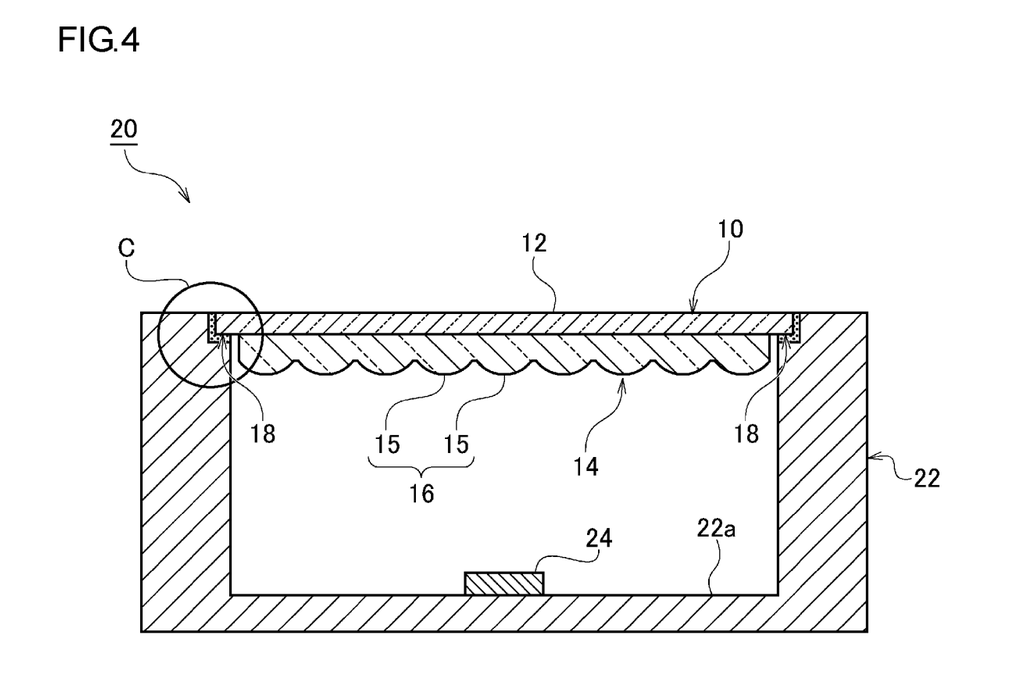
FIG. 4 is a schematic cross-sectional view showing a light emitting device in which the radiation angle changing element according to the first embodiment is used.

FIG. 4 is a schematic cross-sectional view showing a light emitting device 20 in which the radiation angle changing element 10 according to the first embodiment is used. The light emitting device 20 includes a housing 22, a light emitting element 24, and the radiation angle changing element 10.

The housing 22 is made of, for example, ceramic and has a shape of a box having an open top. The light emitting element 24 is provided on a bottom surface 22a of the housing 22. The light emitting element 24 applied may be selected from, not limited to, a surface emitting laser like VCSEL, a FP type semiconductor laser or light emitting diode (LED), a solid-state laser such as YAG laser, a gas laser such as excimer laser, or a discharge lamp such as a metal halide lamp.

The radiation angle changing element 10 is bonded to the housing 22 so as to put a lid on the open top of the housing 22. As a result, the space including the light emitting element 24 is sealed. The radiation angle changing element 10 is arranged such that the surface formed with the microlens array 16 faces the light emitting element 24. In the light emitting device 20 manufactured as described above, the light emitted from the light emitting element 24 is diffused by each microlens 15 of the microlens array 16 and is radiated outside through the glass substrate 12. The glass substrate 12 not only serves as a base member for the microlens array 16 but also has the role of protecting the light emitting element 24. In that sense, the glass substrate 12 is also called a cover glass. Using glass is advantageous from the perspective of mechanical strength and abrasion-resistance.

Figure 5:
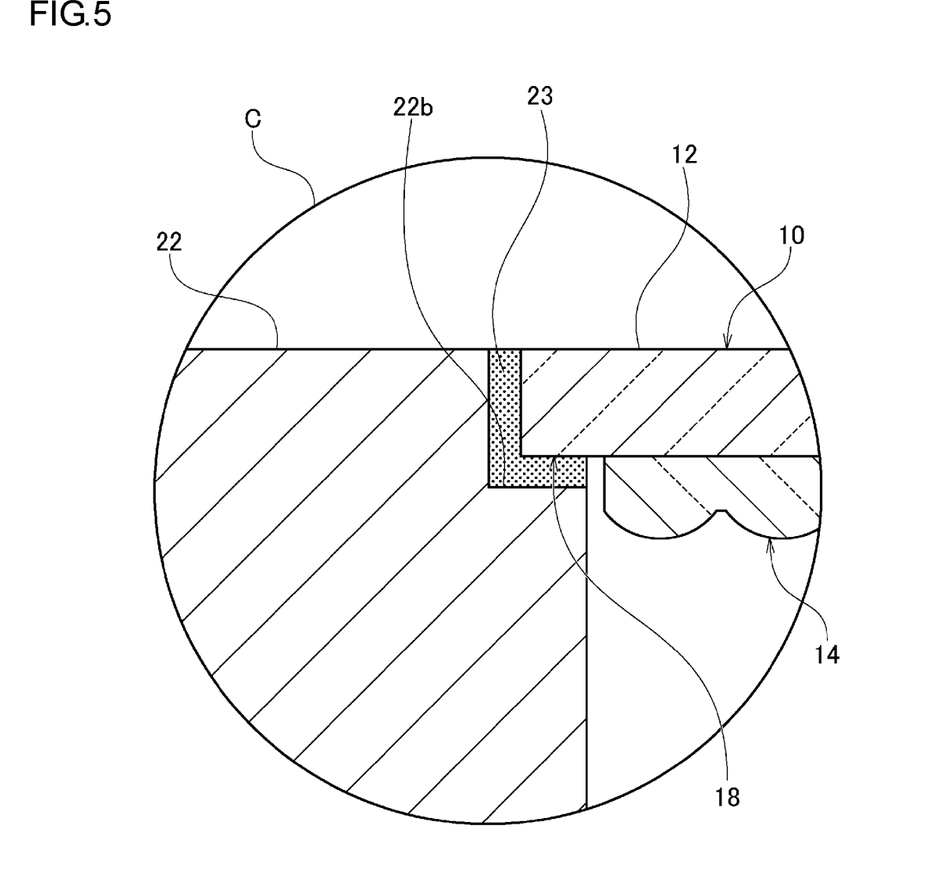
FIG. 5 is an enlarged view of a portion in which the radiation angle changing element and the housing shown in FIG. 4 are bonded.

FIG. 5 is an enlarged view of a portion C in which the radiation angle changing element 10 and the housing 22 shown in FIG. 4 are bonded. A step 22b for bonding the radiation angle changing element 10 is formed at the edge of the opening of the housing 22. The step 22b of the housing 22 and the bonding portion 18 of the radiation angle changing element 10 are bonded by an adhesive 23.

In the radiation angle changing element 10 according to this embodiment, the resin layer 14 is not provided and the glass substrate 12 is exposed in the connecting portion 18. Therefore, bonding occurs between glass and ceramic instead of between resin and ceramic as shown in FIG. 2. Therefore, adhesion is enhanced as compared with the case of bonding between resin and ceramic so that it is possible to bond the element to the housing 22 in which the light emitting element 24 is fixed.

Further, bonding between glass and ceramic helps improve resistance to thermal shock because a difference in coefficient of thermal expansion is smaller than in the case of bonding between resin and ceramic.

Figure 6A:
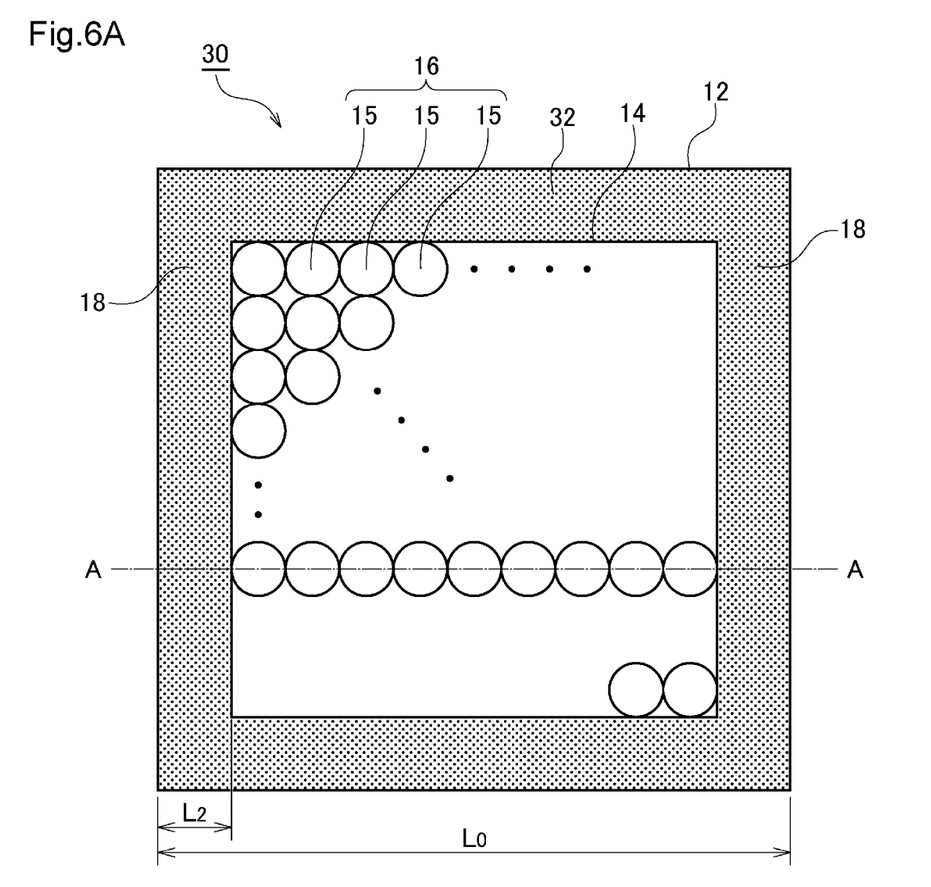
FIGS. 6A and 6B show a radiation angle changing element according to the second embodiment of the present invention.
Figure 6B:
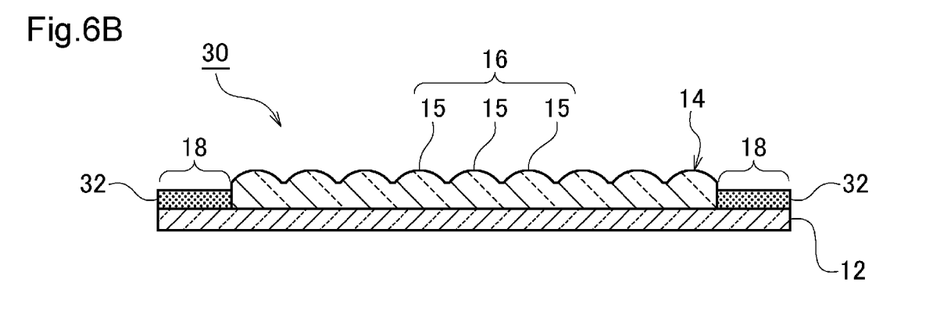

FIGS. 6A and 6B show a radiation angle changing element 30 according to the second embodiment of the present invention. FIG. 6A is a plan view of the radiation angle changing element 30. FIG. 6B is an A-A cross-sectional view of the radiation angle changing element 30 shown in FIG. 6A.

The radiation angle changing element 30 according to the second embodiment differs from the radiation angle changing element 10 according to the first embodiment in that a metal film 32 is formed in the bonding portion 18 outside the resin layer 14 on one of the principal surfaces of the glass substrate 12.

The metal film 32 may be a monolayer film comprised of one type of metal or an alloy of a plurality of metals, or a multilayer film including a stack of a plurality of metal films each made of a single metal. The metal used to form the metal film 32 may include, but not limited to, at least one of Cr, Ni, Pt, Ti, Pd, Au, etc. By way of one example of a multilayer film, Cr, Ni, and Au may be deposited on the glass substrate 12 in the stated order. The thickness of the metal film 32 may be, for example, 0.5 μm.

Denoting the width of the glass substrate 12 by $L_0$, the width of the connecting portion 18 by $L_1$, and the width of the metal film 32 by $L_2$, $L_0$, $L_1$, and $L_2$ are related such that $L_1=L_2$, $0.01L_0 \leq L_2 \leq 0.3L_0$, and, desirably, $0.05L_0 \leq L_2 \leq 0.2L_0$, and, more desirably, $0.01L_0 \leq L_2 \leq 0.15L_0$. If $L_2$ is smaller than $0.01L_0$, a sufficient area for bonding by a solder 44 may not be obtained so that it may be difficult to obtain great bonding strength. If $L_2$ is larger than $0.3L_0$, on the other hand, the area of the connecting portion will be too large, which will be an obstacle to reduction of the element size.

Figure 7:
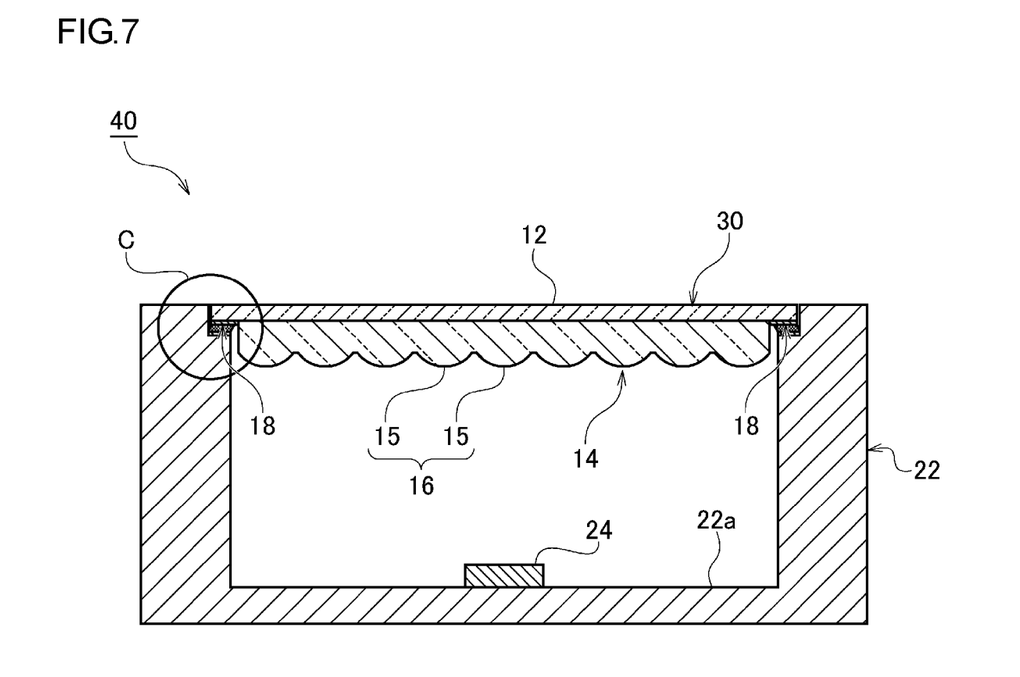
FIG. 7 is a schematic cross-sectional view showing a light emitting device in which the radiation angle changing element according to the second embodiment is used.

FIG. 7 is a schematic cross-sectional view showing a light emitting device 40 in which the radiation angle changing element 30 according to the second embodiment is used. The light emitting device 40 also includes a ceramic housing 22, a light emitting element 24, and the radiation angle changing element 30.

Figure 8:
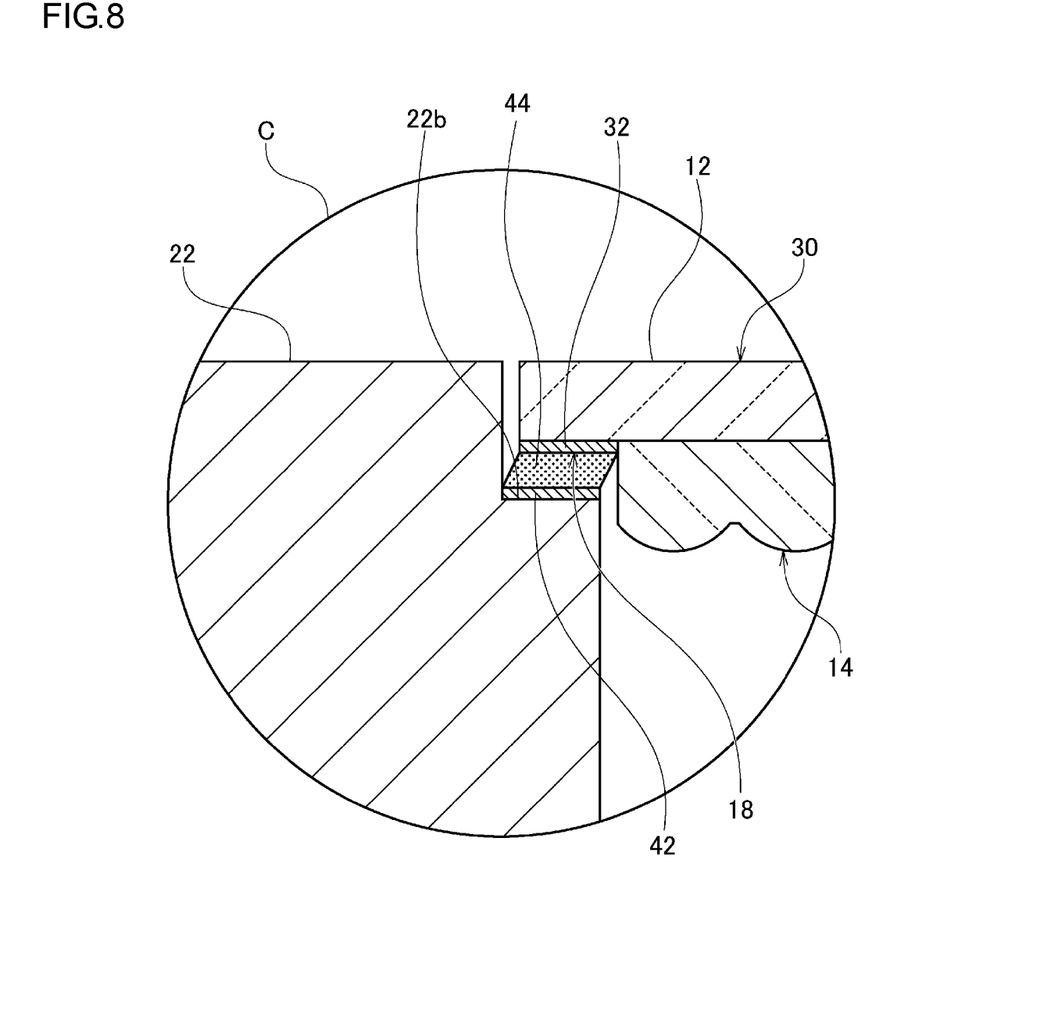
FIG. 8 is an enlarged view of a portion in which the radiation angle changing element and the housing shown in FIG. 7 are bonded.

FIG. 8 is an enlarged view of a portion C in which the radiation angle changing element 30 and the housing 22 shown in FIG. 7 are bonded. As shown in FIG. 8, a step 22b for bonding the radiation angle changing element 30 is formed at the edge of the opening of the housing 22, and a metal film 42 is formed on the step 22b. The metal film 42 may be formed by a method such as plating and vapor deposition.

As described above, the radiation angle changing element 30 according to the second embodiment is configured such that the metal film 32 is formed on the glass substrate 12 at the bonding portion 18. Therefore, the metal film 32 on the radiation angle changing element 30 and the metal film 42 on the housing 22 can be bonded by the solder 44 so that great bonding strength can be obtained.

Figure 9A:
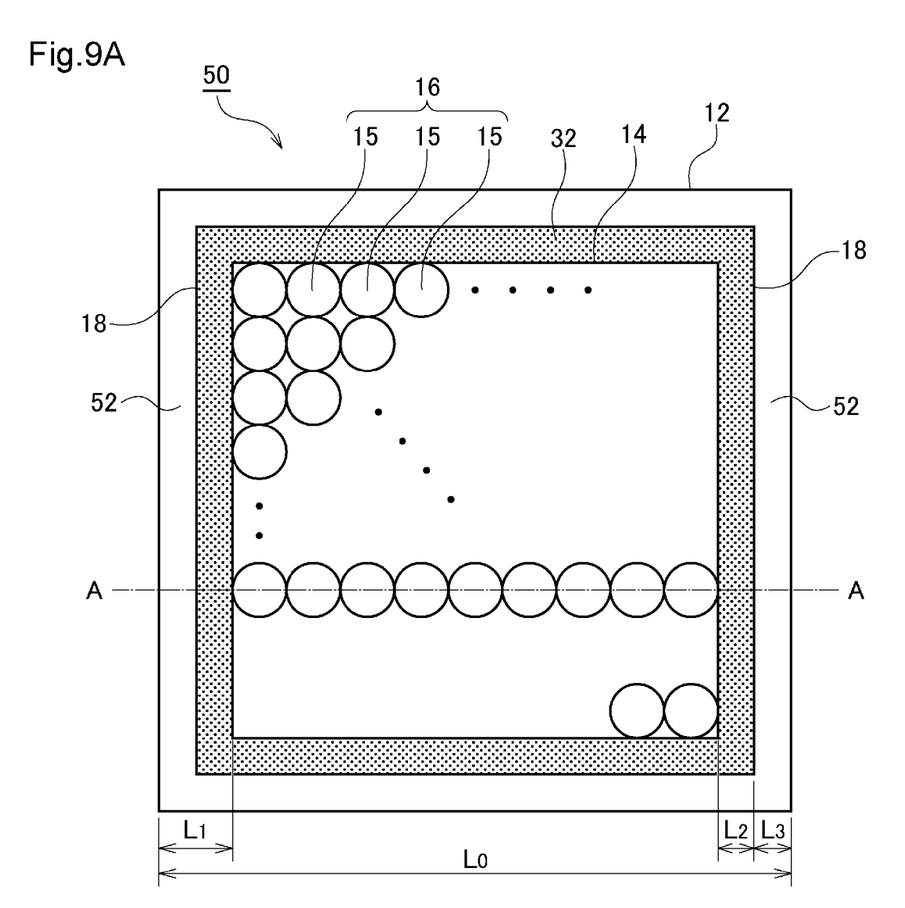
FIGS. 9A and 9B show a radiation angle changing element according to the third embodiment of the present invention.
Figure 9B:
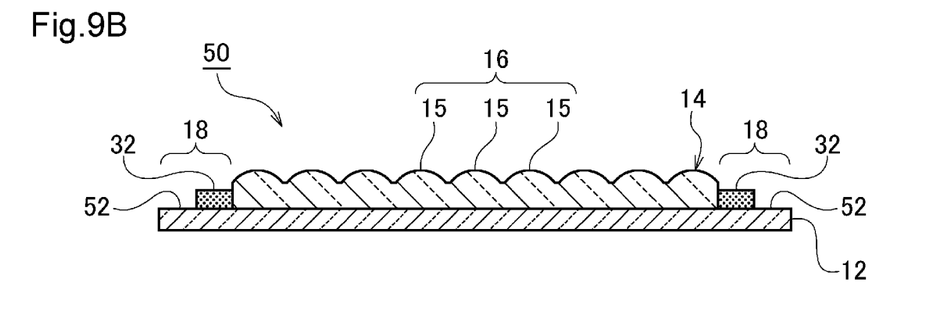

FIGS. 9A and 9B show a radiation angle changing element 50 according to the third embodiment of the present invention. FIG. 9A is a plan view of a radiation angle changing element 50. FIG. 9B is an A-A cross-sectional view of the radiation angle changing element 50 shown in FIG. 9A.

The radiation angle changing element 50 according to the third embodiment differs from the radiation angle changing element 10 according to the first embodiment in that the metal film 32 is formed in the bonding portion 18 outside the resin layer 14, and an exposed portion 52 of the glass substrate 12 is provided further outside the metal film 32. Stated otherwise, the radiation angle changing element 50 according to the third embodiment is configured such that the metal film 32 is formed only in the inward portion of the connecting portion 18, and the surface of the glass substrate 12 is exposed in the outward portion. In the bonding portion 18, the area ratio between the region of the metal film 32 and the region of the exposed portion 52 may be 5:1-1:5.

Denoting the width of the glass substrate 12 by $L_0$, the width of the connecting portion 18 by $L_1$, the width of the metal film 32 by $L_2$, and the width of the exposed portion 52 by $L_3$, $L_0$, $L_1$, $L_2$, and $L_3$ are related such that $L_1=L_2+L_3$, $0.01L_0 \leq L_2+L_3 \leq 0.3L_0$, and, desirably, $0.05L_0 \leq L_2+L_3 \leq 0.2L_0$, and, more desirably, $0.01L_0 \leq L_2+L_3 \leq 0.15L_0$ If $L_2+L_3$ is smaller than $0.01L_0$, a contact area to obtain sufficient bonding strength and airtightness cannot be obtained. If $L_2+L_3$ is larger than $0.3L_0$, on the other hand, the area of the connecting portion will be too large, which will be an obstacle to reduction of the element size. Further, $L_2$ and $L_3$ may meet $0.01L_2 \leq L_3 \leq 10L_2$, and, desirably, $0.05L_2 \leq L_3 \leq L_2$, and, more desirably, $0.10L_2 \leq L_3 \leq 0.5L_2$. If $L_3$ is larger than $0.01L_2$, sufficient tolerance may not be available at the time of cutting. If $L_3$ is larger than $10L_2$, a sufficient area for bonding by the solder 44 may not be obtained so that it may be difficult to obtain great bonding strength.

The metal film 32 may be a monolayer film comprised of one type of metal or an alloy of a plurality of metals, or a multilayer film including a stack of a plurality of metal films each made of a single metal. The metal used to form the metal film 32 may include, but not limited to, at least one of Cr, Ni, Pt, Ti, Pd, Au, etc. By way of one example of a multilayer film, Cr, Ni, and Au may be deposited on the glass substrate 12 in the stated order. The thickness of the metal film 32 may be, for example, 0.5 μm.

Generally, a radiation angle changing element is fabricated by preparing a glass substrate with a principal surface having an area larger than an area of the region the microlens array is formed, molding the microlens array on at least one of the principal surfaces of the glass substrate, and then cutting the glass substrate to a predetermined size. The means described above includes of arranging a plurality of radiation angle changing elements on one of the principal surfaces of a single large glass substrate and then cutting out individual radiation angle changing elements. The method of cutting a glass substrate includes at least one of a method of using a rotating grindstone, a method of cutting using a laser, and a method of marking the substrate with a line with diamond and mechanically cutting the substrate with a glass cutter, or the like. In the case of the method of cutting the glass substrate using a rotating grindstone, the grindstone rotating at a high speed may come into contact with the resin layer, if the resin layer is located at the portion of cutting. This might result in a phenomenon in which the resin layer forming the microlens array is exfoliated at that portion. If, in the case of the method of cutting using laser, the resin layer or the metal layer is located at the portion of cutting the glass substrate, the resin layer or the metal layer may also be irradiated with a laser while the glass substrate is irradiated with the laser, a portion of the microlens formed on the resin layer may be melted or vaporized, and the melted or vaporized portion turns into a defect. Further, if, in the case of the method of marking the substrate with a line with diamond and mechanically cutting the substrate, the resin layer or the metal layer is located at the portion of cutting, it will be difficult to mark the glass substrate underneath with a line, and, as a result, a failure in cutting occurs easily.

In the radiation angle changing element 50 according to the third embodiment, the exposed portion 52 of the glass substrate 12 is provided outside the metal film 32 in the bonding portion 18 so that the grindstone, laser irradiation, or the leading edge of the cutter directly acts on the glass substrate 12. This consequently prevents the metal film 32 and the resin layer 14 from being damaged and inhibits reduction in the yield and occurrence of defective products caused by foreign materials mixed while cutting the substrate.

A description will now be given of a method of manufacturing a radiation angle changing element. It should be noted that the following description does not limit the method of manufacturing the radiation angle changing element according to the present invention.

The radiation angle changing element can be fabricated by a so-called step and repeat method. A step and repeat method is a method including forming a structure partially on a substrate by using a mold of a predetermined size and forming the structure on the entirety of the substrate by repeating the molding step while shifting the position of molding. JP2014-188869, JP2014-13902, JP2010-245470, JP2010-80632, JP2008-168641, JP2007-103924, JP2006-245072, etc. may be referred to for the steps of the method.

In the method of forming a structure such as microlens on a substrate, a mold is prepared in which the area where the structure is formed is smaller than the area of the principal surface of the glass substrate. A work including of a photocurable resin layer on a glass substrate is aligned with the mold formed with a predetermined lens shape on its surface, and the gap between the work and the mold is filled with resin, and the filled portion is irradiated with light such as ultraviolet light to cure the resin. In this process, ultraviolet light is radiated only to the location immediately beneath the mold. By successively performing such transfer steps in the substrate, a predetermined pattern can be formed on the entire surface of the glass substrate.

There are various methods of fabricating a mold. For example, the lens shape may be formed by mechanically working a metal such as Ni, or the lens shape made of photosensitive resin may be formed on a glass or semiconductor substrate by photolithography. Alternatively, duplication from such a mold may be made by electrocasting. Still further, a mold is fabricated by molding a photosensitive resin using the mold fabricated by the method described above. In the following exemplary manufacturing method, a metal mold obtained by fabricating a resist pattern of a microlens array by laser drawing and electroforming the pattern is used.

Figure 10A:
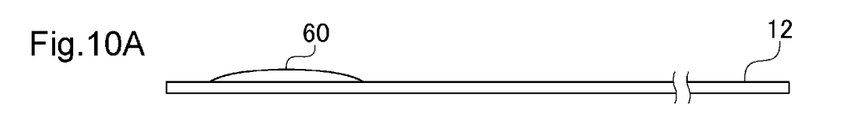
FIGS. 10A, 10B, 10C, 10D, 10E, 10F and 10G show an exemplary process to manufacture the radiation angle changing element.
Figure 10B:
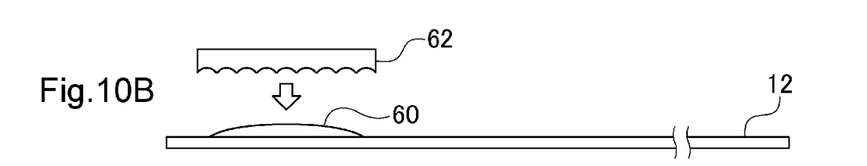
Figure 10C:
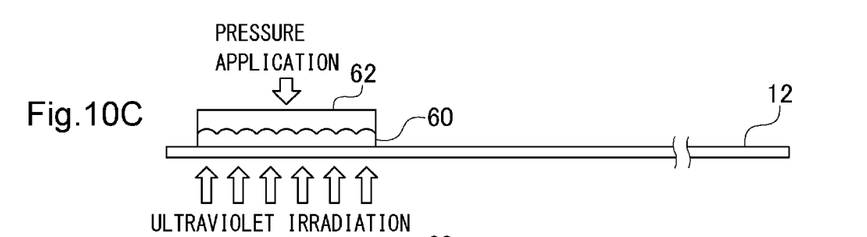
Figure 10D:
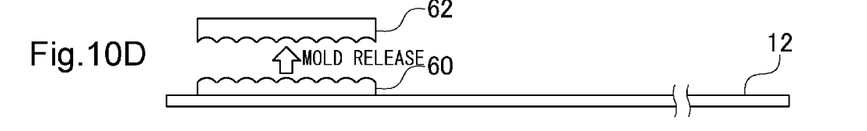
Figure 10E:
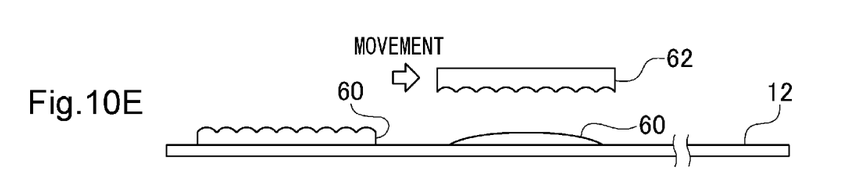
Figure 10F:
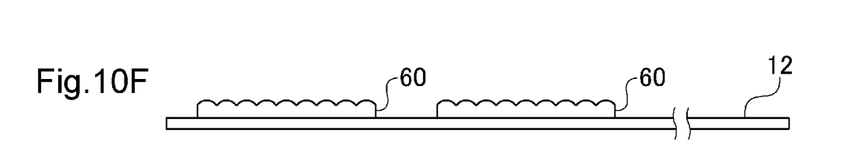
Figure 10G:
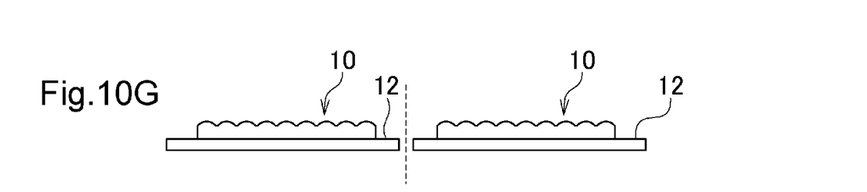

FIGS. 10A, 10B, 10C, 10D, 10E, 10F and 10G show an exemplary process to manufacture the radiation angle changing element. First, as shown in FIG. 10A, a predetermined amount of ultraviolet curable resin 60 is dropped on a predetermined location on one of the principal surfaces of the glass substrate 12 prepared. Then, as shown in FIG. 10B, a mold 62 and the glass substrate are aligned on a surface of the mold 62 parallel to the principal surface of the glass substrate 12. Then, as shown in FIG. 10C, the mold 62 is pressed so that the ultraviolet curable resin 60 fills a space between the glass substrate 12 and the mold 62. A prescribed region is irradiated with ultraviolet rays in an irradiation size corresponding to the size of the mold 62 while the mold 62 is being pressed. Then, as shown in FIG. 10D, the mold 62 is released. Then, as shown in FIG. 10E, the steps of FIG. 10A-10D are repeated, while changing the working location on the glass substrate 12. By repeating these steps, a large number of radiation angle changing elements are formed on the entire surface of the glass substrate 12, as shown in FIG. 10F. A heat treatment process may be performed subsequently as necessary. Further, the mold 62 may be subjected to a treatment that facilitates the mold release of the resin. Finally, the radiation angle changing element 10 shown in FIGS. 3A and 3B is obtained by cutting the glass substrate 12 as shown in FIG. 10G.

Figure 11A:
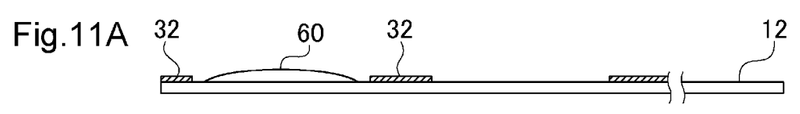
FIGS. 11A, 11B, 11C, 11D, 11E, 11F and 11G show another exemplary process to manufacture the radiation angle changing element.
Figure 11B:
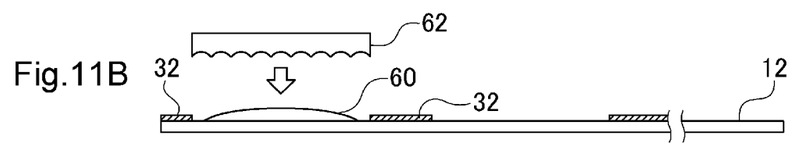
Figure 11C:
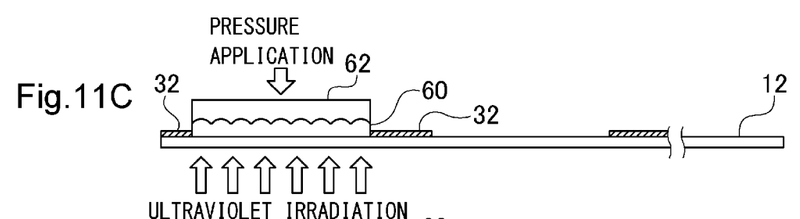
Figure 11D:
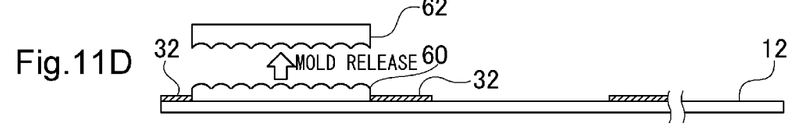
Figure 11E:
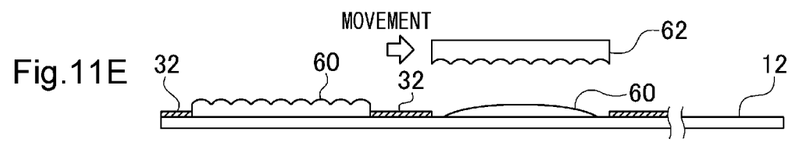
Figure 11F:
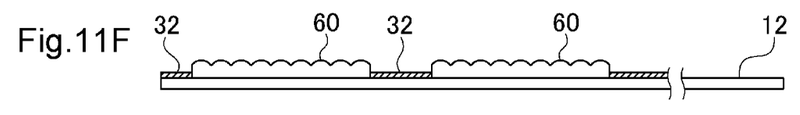
Figure 11G:
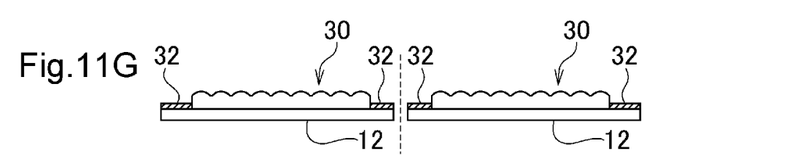

FIGS. 11A, 11B, 11C, 11D, 11E, 11F and 11G show another exemplary process to manufacture the radiation angle changing element. The difference from the manufacturing process shown in FIGS. 10A, 10B, 10C, 10D, 10E, 10F and 10G is that a pattern of the metal film 32 is formed in advance on a portion of the glass substrate 12 before the radiation angle changing element is molded. In this case, there is an advantage in that the pattern of the metal film 32 also has a function of a light shielding film for shielding light during ultraviolet irradiation so that the ultraviolet curable resin 60 that exudes out of the mold 62 is not cured. By configuring the mold 62 to be made of a translucent material, it is possible to radiate ultraviolet light from behind the mold and to cause the metal film 32 and a portion of the ultraviolet curable resin 60 to overlap each other. By cutting the glass substrate 12 as shown in FIG. 11G, the radiation angle changing element 30 shown in FIGS. 6A and 6B can be obtained.

Figure 12A:
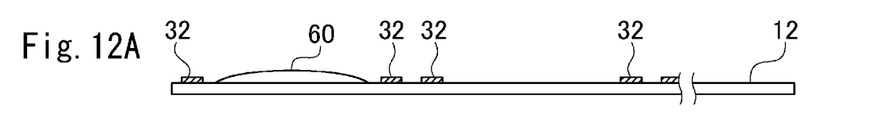
FIGS. 12A, 12B, 12C, 12D, 12E, 12F and 12G show still another exemplary process to manufacture the radiation angle changing element.
Figure 12B:
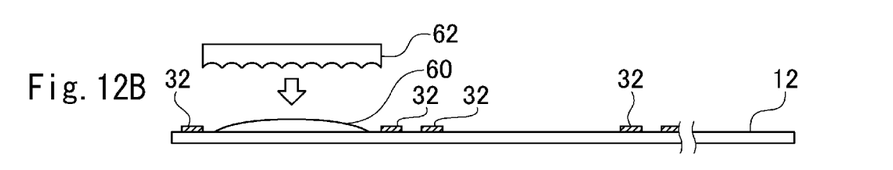
Figure 12C:
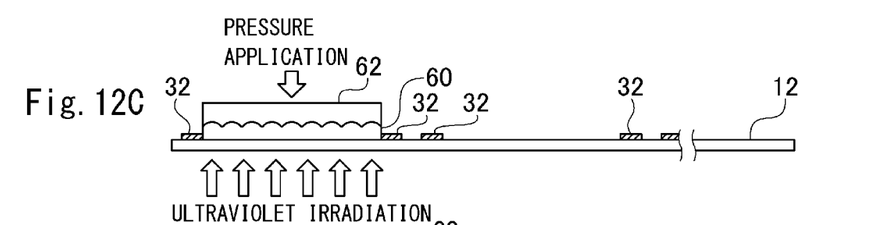
Figure 12D:
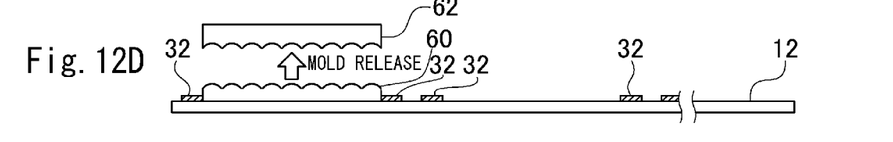
Figure 12E:
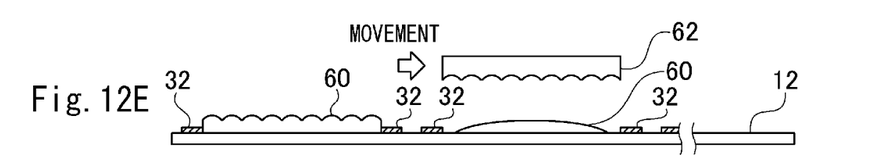
Figure 12F:
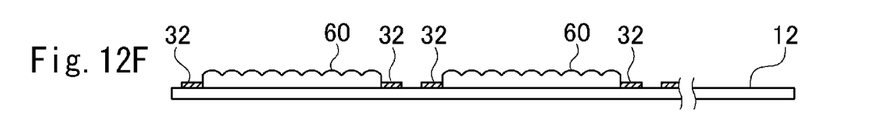
Figure 12G:
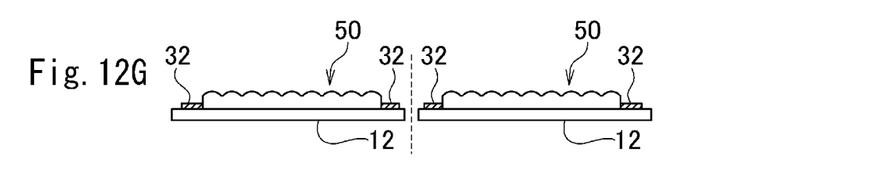

FIGS. 12A, 12B, 12C, 12D, 12E, 12F and 12G show still another exemplary process to manufacture the radiation angle changing element. This manufacturing process is the same as the manufacturing process shown in FIGS. 11A, 11B, 11C, 11D, 11E, 11F and 11G in that a pattern of the metal film 32 is formed in advance on a portion of the glass substrate 12 before the radiation angle changing element is molded. This manufacturing process differs from the manufacturing process shown in FIGS. 11A and 11B in that a portion not formed with the metal film 32 (a portion exposing the glass substrate 12) is provided outside the metal film 32. By cutting the exposed portion of the glass substrate 12 outside the metal film 32 as shown in FIG. 12G, the radiation angle changing element 50 shown in FIGS. 9A and 9B can be obtained.

In the exemplary manufacturing processes described above, a suitable amount of ultraviolet curable resin 60 is dropped on the glass substrate 12, and the ultraviolet curable resin 60 pressed by the mold 62 and the substrate 12. Conversely, the ultraviolet curing resin 60 that has not cured may be dropped on the mold 62, and the ultraviolet curable resin 60 may be pressed by the mold 62 and the substrate 12.

Further, the surface of the microlens array 16, the rear surface of the glass substrate 12 (the surface not formed with the microlens array 16), or both may be coated to reduce reflection (AR coating) before the glass substrate 12 is cut.

The metal film 32 may be patterned on the glass substrate 12 by depositing a metal film by plating, sputtering, or vapor deposition, forming a resist pattern thereon by photolithography, and removing an unnecessary metal film by etching, using the resist pattern as a mask. Alternatively, a resist pattern may be formed on the glass substrate 12 before the metal film is deposited, the metal film may be deposited thereon, and then the resist and the metal film deposited thereon may be removed (liftoff method).

The type of the metal film 32 may be appropriately selected in consideration of the adhesion to glass, sealing capability, or adhesion to the sealing member, etc. The metal film 32 may be comprised of a single metal or configured as a multilayer film in consideration of the adhesion of the respective parts. For example, a three-layer film in which Cr, Ni, and Au are deposited on the glass substrate 12 in the stated order may be used. Of course, the combination of metals is not limited to this, and selection is made from various metal films and combinations thereof.

Given above is an explanation based on an exemplary embodiment. The embodiment is intended to be illustrative only and it will be understood by those skilled in the art that various modifications to combinations of constituting elements and processes are possible and that such modifications are also within the scope of the present invention.

What is claimed is:

1. A radiation angle changing element configured to be bonded to a housing of a light emitting device having a light emitting element therein, comprising:
   a glass substrate having a first principal surface and a second principal surface parallel to the first principal surface;
   a resin layer provided on a first part of the first principal surface of the glass substrate, the resin layer having a microlens array on a surface opposite to the side of the glass substrate;
   a bonding portion provided outside the resin layer in a plan view on the first principal surface of the glass substrate, the bonding portion not including resin layer; and
   a first metal film provided in the bonding portion on the first principal surface of the glass substrate,
   a metal film is not provided on the second principal surface of the glass substrate,
   wherein the radiation angle changing element receives a light with a first radiation angle from the light emitting element and emits a light with a second radiation angle larger than the first radiation angle.

2. The radiation angle changing element according to claim 1, wherein the bonding portion includes a part where the first principal surface of the glass substrate which is exposed.

3. The radiation angle changing element according to claim 1, wherein the microlens array includes a plurality of microlenses are arranged in a two-dimensional array.

4. A light emitting device comprising:
   the radiation angle changing element according to claim 1;
   a housing including at least an opening closed by the radiation angle changing element; and
   a light emitting element provided in the housing, emitting a light with a first radiation angle toward the radiation angle changing element,
   wherein the radiation angle changing element and the housing are integrated by adhering a part of a peripheral area of the radiation angle changing element and the opening of the housing at the bonding portion with an adhesive, and,
   wherein the light emitting device emits a light with a second radiation angle larger than the first radiation angle.

5. The light emitting device according to claim 4, wherein the opening of the housing has a step on an edge of the opening to put the radiation angle changing element thereon.

6. The light emitting device according to claim 4, wherein the housing is made of a ceramic.

7. The light emitting device according to claim 4, wherein the first principal surface of the radiation angle changing element faces inside of the housing.

8. A light emitting device comprising:
   the radiation angle changing element according to claim 1;
   a housing including at least an opening closed by the radiation angle changing element; and
   a light emitting element provided in the housing, emitting a light with first radiation angle toward the radiation angle changing element,
   wherein the opening of the housing has a step on an edge of the opening,
   wherein the step has a surface parallel to the first principal surface of the glass substrate of the radiation angle changing element,
   the second metal film is provided only on the surface of the step parallel to the first principal surface,
   wherein the radiation angle changing element and the housing are integrated by bonding the first metal film of the radiation angle changing element and the second metal film provided in the step of the housing with a solder, and
   wherein the light emitting device emits a light with a second radiation angle larger than the first radiation angle.

9. The radiation angle changing element according to claim 1, wherein the second principal surface of the glass substrate is flat.

10. The light emitting device according to claim 8, wherein the second principal surface of the glass substrate of the radiation angle changing element is flat,
    wherein the housing has a flat top surface, and
    wherein the top surface of the housing and the second principal surface of the glass substrate are substantially flush.

11. A method of manufacturing the radiation angle changing element according to claim 1, comprising:
    (i) preparing the glass substrate;
    (ii) forming a pattern of a metal film on the first principal surface of the glass substrate;
    (iii) coating a region surrounded by the pattern of a metal film with a photo-curable resin;
    (iv) forming a plurality of microlens arrays on a surface of the photo-curable resin, including:
       pressing a mold for forming the microlens arrays on the photo-curable resin;
       curing the photo-curable resin by irradiating the photo-curable resin with light; and
       releasing the mold from the glass substrate, (v) repeating (iii) and (iv) within the first principal surface of the glass substrate; and
(vi) cutting the glass substrate in a region where the metal film is formed to obtain a plurality of radiation angle changing elements.

* * * * *